US007193612B2

(12) United States Patent
Lindhout et al.

(10) Patent No.: US 7,193,612 B2
(45) Date of Patent: Mar. 20, 2007

(54) SCROLLING APPARATUS PROVIDING MULTI-DIRECTIONAL MOVEMENT OF AN IMAGE

(75) Inventors: Daan Lindhout, Seattle, WA (US); Timothy Michael Muss, Seattle, WA (US); Steven N. Bathiche, Redmond, WA (US); Steven W. Fisher, Kirkland, WA (US); Kenneth P. Hinckley, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 681 days.

(21) Appl. No.: 10/183,994

(22) Filed: Jun. 28, 2002

(65) Prior Publication Data

US 2004/0001042 A1    Jan. 1, 2004

(51) Int. Cl.
*G09G 5/00*        (2006.01)
(52) U.S. Cl. ............... 345/164; 345/157; 345/684; 345/160; 348/734
(58) Field of Classification Search ........ 345/156–169, 345/784–787, 684; 463/37–38; 348/734; 715/784–786; 273/148 B
See application file for complete search history.

(56) References Cited

U.S. PATENT DOCUMENTS

| 5,510,811 | A   | 4/1996  | Tobey et al. |
| 5,517,257 | A   | 5/1996  | Dunn et al. |
| 5,910,798 | A * | 6/1999  | Kim ............................ 345/163 |
| 5,912,661 | A   | 6/1999  | Siddiqui |
| 6,075,518 | A   | 6/2000  | Pruchniak |
| 6,075,575 | A * | 6/2000  | Schein et al. ................ 348/734 |
| 6,097,371 | A   | 8/2000  | Siddiqui et al. |
| 6,097,372 | A * | 8/2000  | Suzuki ........................ 345/167 |
| D431,037  | S   | 9/2000  | Varga et al. |
| 6,132,118 | A * | 10/2000 | Grezeszak ................... 400/489 |
| 6,198,473 | B1* | 3/2001  | Armstrong ................... 345/163 |
| 6,281,881 | B1  | 8/2001  | Siddiqui et al. |
| 6,348,912 | B1* | 2/2002  | Smith ......................... 345/163 |
| 6,353,429 | B1  | 3/2002  | Long |
| 6,380,927 | B1  | 4/2002  | Ostrum et al. |
| 6,697,050 | B1* | 2/2004  | Shinohe et al. ............. 345/163 |

FOREIGN PATENT DOCUMENTS

JP     2000-200147     *  7/2000

OTHER PUBLICATIONS

Web page reviewing "Kensington TurboRing Trackball"; http://www.avault.com/hardware/print_review.asp?review=turboring; publication date unknown, but believed to be prior to Jun. 28, 2002.
Web page reviewing "TurboRing"; http://www.macworld.com/2000/10/reviews/turboring.html; publication date unknown, but believed to be prior to Jun. 28, 2002.

(Continued)

*Primary Examiner*—Lun-Yi Lao
(74) *Attorney, Agent, or Firm*—Banner & Witcoff, Ltd.

(57) ABSTRACT

The invention is a scrolling apparatus may be incorporated into an input device, such as a pointing device or a keyboard, for example, and operatively connected to a host computer to scroll an image along multiple axes relative to a display screen. The scrolling apparatus includes a rotatable member with the configuration of a wheel or a ball. In addition, the scrolling apparatus includes a depressible actuator located around the rotatable member. Both the rotatable member and the actuator, which scroll the image in different scrolling directions or at different scrolling velocities, for example, may be utilized for scrolling the image.

36 Claims, 7 Drawing Sheets

OTHER PUBLICATIONS

Web page from "Van's Hardware"; http://www.vanshardware.com/reviews/2001/october/011002_TurboRing/011002_TurboRing.htm published Oct. 2, 2001.

Web page reviewing "TurboRing"; http://www.keyalt.com/pointdevices/turboring.htm; publication date unknown, but believed to be prior to Jun. 28, 2002.

Web page for "Micro TRAC™"; http://www.microspeed.com/products/pd600s.html; publication date unknown, but believed to be prior to Jun. 28, 2002.

Web page for "Kid TRAC" model PD-280S; http://www.microspeed.com/products/kidtrac.html; publication date unknown, but believed to be prior to Jun. 28, 2002.

Web page for Kid TRAC User's Manual; http://www.microspeed.com/pages/support/manuals/kidtracm.html; publication date unknown, but believed to be prior to Jun. 28, 2002.

Web page for "Ateck" A4 RFW-33 Radio Wireless PS/2 Mouse; http://www.shop.store.yahoo.com/4itech/a4rfradwirps.html; publication date unknown, but believed to be prior to Jun. 28, 2002.

Web page for "Sakar Yahoo! 4D Internet Scroll Mouse" and "Sakar Optical Mouse w/Email alert Metallic Silver (USB)"; http://www.slarp.com/products/Input_Devices/Mice_and_Trackballs/; publication date unknown, but believed to be prior to Jun. 28, 2002.

Web page for "ICONCEPTS 70152"; http://www.panwebi.com/products/computer/mouse/70152.htm; publication date unknown, but believed to be prior to Jun. 28, 2002.

Web page for "Yahoo 8D Internet Mouse"; http://www.panwebi.com/products/computer/mouse/8dinternetmouse.htm; publication date unknown, but believed to be prior to Jun. 28, 2002.

* cited by examiner

SCROLLING APPARATUS PROVIDING MULTI-DIRECTIONAL MOVEMENT OF AN IMAGE

FIELD OF THE INVENTION

The present invention relates to a scrolling apparatus for moving an image in multiple directions relative to a display screen. More particularly, the present invention relates to a scrolling apparatus that may be incorporated into an input device, such as a pointing device or a keyboard, for example, and operatively connected to a host computer for scrolling an image along multiple axes relative to a display screen.

BACKGROUND OF THE INVENTION

The viewable contents of a computer file, such as a text document, spreadsheet, digital photograph, Web page, or other image rendered on a conventional display screen, may possess a size exceeding the viewable boundaries of the display screen. To address this issue, an individual may utilize a scrolling method to scroll the image relative to the display screen. Scrolling, as used herein and as is known in the art, describes the movement of an image relative to a display screen in a particular direction. For example, "scrolling down" generally describes moving the viewable contents of a file (such as a text document or image) relative to a display screen so as to produce an effect of moving down in the document or image. Similarly, the terms scroll up, scroll left and scroll right relate to moving the viewable contents of a file relative to a screen so as to produce an effect of moving a document or image up, left, and right, respectively. The term scrolling as used herein also includes panning, which is the automatic and/or continuous scrolling of an image, often in response to a single command or input.

Scroll wheels have been provided on computer mice, and have been used by computer operators to move an image on a display screen. A scroll wheel assembly typically includes a rotatable scroll wheel and a sensor to measure and encode rotation. Typically, the scroll wheel is located within a housing of a mouse or other peripheral computer device. A portion of the scroll wheel protrudes upwardly out of an opening in the housing, and is rotated in order to vertically scroll the image displayed on the screen. An example of a mouse including a known scroll wheel assembly is described in U.S. Pat. No. 5,912,661, entitled "Z-ENCODER MECHANISM" which is hereby fully incorporated by reference.

In operation, a conventional scroll wheel is normally rotated about a transversely extending axis secured within a housing. An encoder wheel is coupled to the scroll wheel and rotates when the scroll wheel rotates. As the scroll wheel is rotated, an encoder senses the rotation of the encoder wheel, and delivers a corresponding signal to a host computer. That signal can be used to move an image, as is known in the art and disclosed in U.S. Pat. No. 5,912,661. Notably, this allows a user to scroll the image without changing the position of the mouse and/or the cursor, and instead only requires rotating the scroll wheel (versus the entire mouse or other device) with a thumb or finger. However, displayable portions of spreadsheets and many other types of documents and screen images are often wider than the display screen, and the user must also scroll horizontally across the screen to see the entire file. When the user needs to move the image horizontally across the display screen, the user must typically perform additional steps beyond what is required for vertical scrolling. This can include locating a graphical user interface in the form of a horizontal scroll bar (usually located near the bottom of the display), positioning the cursor on the scroll bar, and then rotating the wheel. Locating the scroll bar can be very difficult for people with bad eyesight, small display screens and/or poor hand-eye coordination. Using a horizontal scroll bar also requires a user to shift his or her gaze from the portion of the document being viewed, and then relocate that portion after horizontal scrolling. Even if the size of the horizontal scroll bar and/or the screen resolution can be adjusted, the user must nevertheless perform additional pointing tasks which are more time-consuming and mentally intensive than simply rotating a wheel or pushing a button. Alternative graphically assisted tools for horizontal scrolling (e.g., positioning a cursor over a horizontal scroll bar, selecting the scroll bar, and moving the cursor) also require cursor repositioning, and have similar drawbacks.

Microside Corporation of Miami, Fla. offers a "Micro Scroll II" mouse that permits a user to scroll an image in multiple perpendicular directions. This mouse includes a first rotatable wheel for scrolling an image up and down, and a second, separate rotatable wheel for scrolling an image left and right. The rotatable wheels are oriented so they extend and rotate in planes that are perpendicular to each other. The two scroll wheels are independently operable. However, this arrangement has drawbacks. The two wheels take up limited space on the upper surface area on the mouse, which could be used for supporting the hand of the user or for additional input keys. Further, the two wheels are relatively small in size so as to accommodate both wheels on the upper surface of the mouse. The smaller sized scroll wheels make the scrolling more difficult to control. Additionally, the location of the horizontal scroll wheel can be inconvenient for effective control. Further, with this design, it might be difficult for some users to easily reach and manipulate both of the wheels.

Accordingly, there remains a need for improved input devices facilitating scrolling in multiple directions.

SUMMARY OF THE INVENTION

To address these issues, the present invention is a scrolling apparatus that may be incorporated into an input device, such as a pointing device or a keyboard, for example, and operatively connected to a host computer to scroll an image along multiple axes relative to a display screen. The scrolling apparatus includes a rotatable member with the configuration of a scroll wheel or a scroll ball that allows a user to conveniently scroll a screen image, in multiple directions, with simple thumb or finger movements. In addition, the scrolling apparatus includes a depressible actuator located proximal to the rotatable member. Both the rotatable member and the actuator, which scroll the image in different scrolling directions or at different scrolling velocities, for example, may be utilized for scrolling the image.

This scrolling apparatus provides an individual with a selection regarding the manner in which the image is scrolled. Both the rotatable member and the actuator may be configured to scroll the image in various scrolling directions and at various scrolling velocities. For example, the rotatable member may be a wheel that rotates in two directions, thereby permitting the rotatable member to control two scrolling directions. The actuator, however, may be utilized to control scrolling in any direction and at a different velocity than the rotatable member. Accordingly, the individual may select either the rotatable member or the actuator to perform a specific scrolling function.

The advantages and features of novelty characterizing the present invention are pointed out with particularity in the appended claims. To gain an improved understanding of the advantages and features of novelty characterizing the present invention, however, reference may be made to the following descriptive matter and accompanying drawings that describe and illustrate various embodiments of the invention.

BRIEF DESCRIPTION OF THE DRAWINGS

The foregoing Summary of the Invention, as well as the following Detailed Description of the Invention, will be better understood when read in conjunction with the accompanying drawings.

DETAILED DESCRIPTION OF THE INVENTION

The figures and following discussion disclose multi-directional scrolling apparatuses for moving or scrolling an image along a variety of axes relative to a display screen. Viewable portions of computer files, which include text documents, spreadsheets, digital photographs, computer-generated drawings, or Web pages, for example, may be rendered as an image on a display screen. The manner in which the image is configured to be rendered on the display screen determines whether all portions of the image are simultaneously rendered within viewable boundaries of the display screen. Accordingly, the image may be configured to possess dimensions fitting entirely within the viewable boundaries of the display screen. The same image, however, may also be configured to possess dimensions exceeding the viewable boundaries of the display screen. In other words, the image may include a rendered portion that is currently viewable on the display screen and a hidden portion that is not simultaneously viewable on the display screen. The scrolling apparatuses of the present invention are utilized to scroll the image in multiple directions relative to the display screen, thereby revealing the hidden portions of the image.

Figure 1:
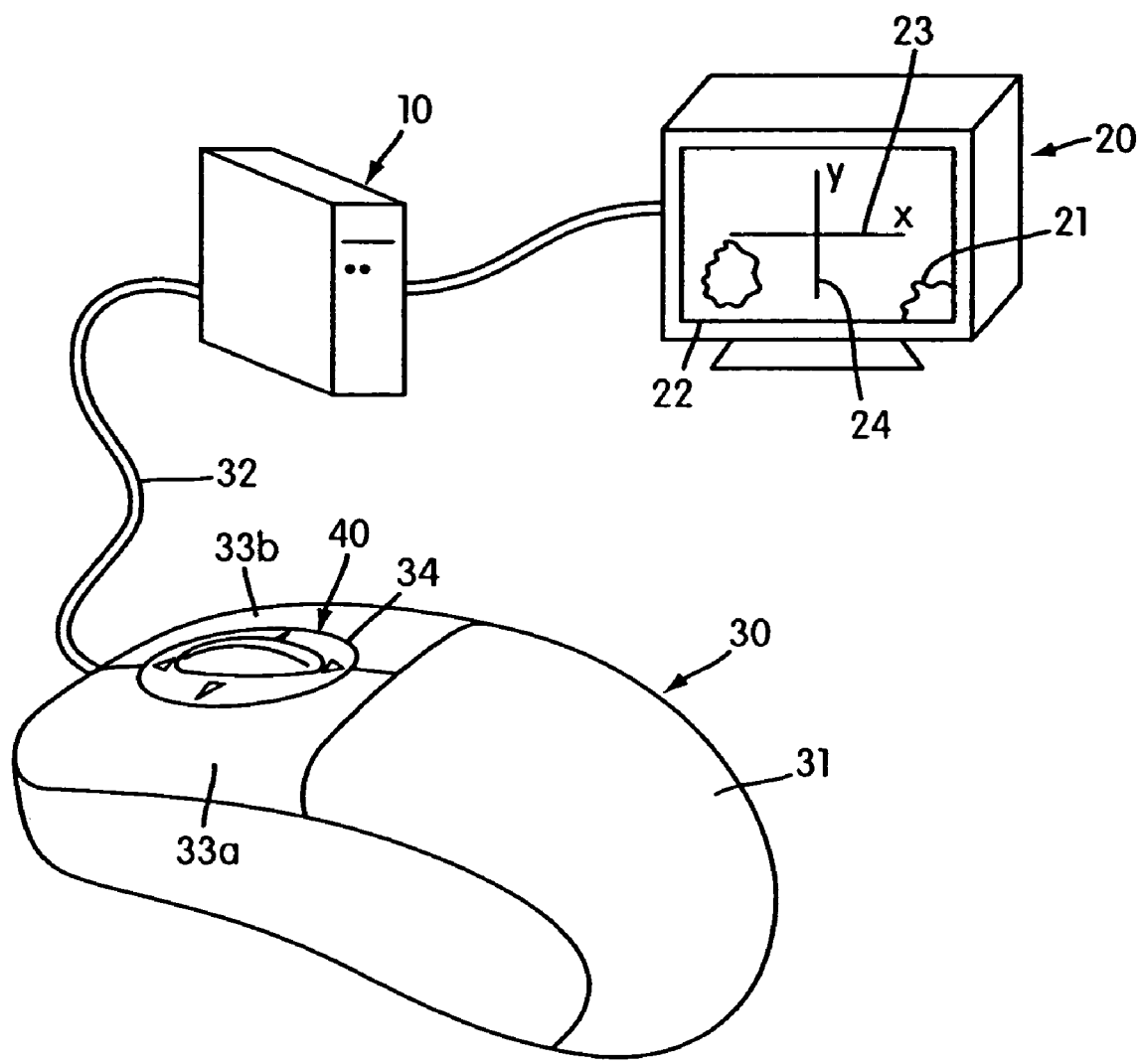
FIG. 1 is a perspective view of a first input device incorporating a first scrolling apparatus in accordance with the present invention, the first input device being operatively connected to a host computer and a display device.

FIG. 1 depicts a host computer 10 operatively connected to a display device 20 and an input device 30. One skilled in the relevant art will recognize that a computer file may be processed by host computer 10 and a signal may be transmitted to display device 20, thereby directing display device 20 to render an image 21 on display screen 22. Image 21 includes, in accordance with the discussion above, a rendered portion and a hidden portion. An individual viewing image 21 will not, therefore, view all portions of image 21 simultaneously. To address this issue, input device 30 incorporates a scrolling apparatus 40 that may be utilized by the individual to scroll image 21 relative to display screen 22. More particularly, image 21 may be scrolled in a variety of directions, including directions corresponding with an x-axis 23 and a y-axis 24, which are depicted for reference on display screen 22. The individual may, therefore, utilize scrolling apparatus 40 to scroll image 21 in a variety of directions, including up, down, left, right, and any diagonal direction, thereby permitting the individual to view previously hidden portions of image 21.

Scrolling apparatus 40 is depicted in the figures as being incorporated into input device 30, which is a pointing device, particularly a mouse. In addition to the mouse-style pointing device, scrolling apparatus 40 may also be incorporated into other types of input devices, including a trackball pointing device, a touchpad pointing device, and a keyboard, for example. Within the scope of the present invention, however, scrolling apparatus 40 may also be incorporated into a plurality of other computer-related appliances, such as the bezel of a personal data assistant or handheld computing device, a web pad or other internet appliance, a gaming controller, or a chassis of a notebook computer, for example. The manner in which scrolling apparatus 40 may be incorporated into a computer system is not limited, therefore, to the precise example embodied by input device 30, but may be incorporated into a variety of components to provide the scrolling functions discussed herein.

Figure 2:
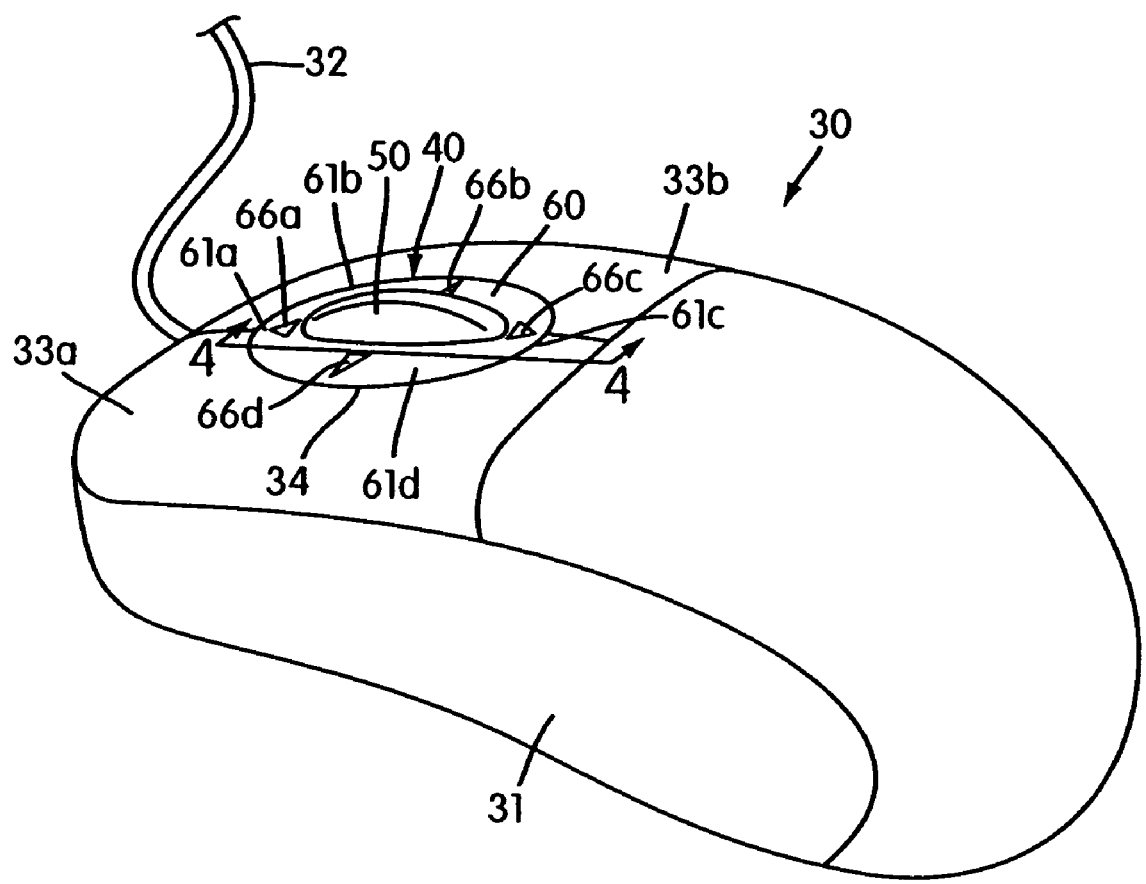
FIG. 2 is a perspective view of the first input device incorporating the first scrolling apparatus.

Input device 30 is depicted individually in FIG. 2 and serves multiple functions, including the functions of scrolling apparatus 40. As represented, input device 30 is a mouse-style pointing device having an outer housing 31 generally shaped to conform to the shape of a hand. A tracking assembly (not depicted) is partially enclosed within housing 31 for determining the relative movement of input device 30 relative to a support surface, as is known in the art. The tracking assembly includes a rollball and a sensor. The rollball extends partially outward from housing 31 and rotates in multiple directions, with the sensor detecting the direction of rotation. An optical tracking system may also be employed, as is known in the art. Upon rotation of the rollball, a signal is transmitted to host computer 10 through a cord 32, thereby directing host computer 10 to move a cursor on display screen 20. Alternately, the signal may be transmitted to host computer 10 through a wireless connection, as is known in the art. Housing 31 also forms a primary key 33a and a secondary key 33b for manipulating objects, such as hypertext links, buttons, or icons, on display screen 22. In general the cursor may be positioned over an object through use of the pointing assembly, and one of keys 33a and 33b may be depressed, thereby manipulating the object by transmitting a corresponding signal to host computer 10 through cord 32. As utilized herein, depress is meant to generally refer to movement toward an interior of housing 31.

Housing 31 includes an aperture 34 therein for providing access to scrolling apparatus 40. More particularly, aperture 34 is positioned between keys 33a and 33b. When operating input device 30, the hand of the individual will generally rest upon an upper surface of housing 31 such that the fingers extend over keys 33a and 33b and over scrolling apparatus 40. The fingers may then be utilized to operate keys 33a and 33b and scrolling apparatus 40. Within the scope of the present invention, however, aperture 34, or any other aperture for providing access to scrolling apparatus 40, may be located in other portions of housing 31. As discussed above, scrolling apparatus 40 may also be incorporated into other input devices. With regard to the keyboard, handheld computing device, or notebook computer, for example, an aperture for scrolling apparatus 40 may be located at any position that provides the individual with convenient access and operation of scrolling apparatus 40.

The structure of scrolling apparatus 40 will now be discussed in greater detail and includes two primary elements, a scroll wheel 50 and an actuator 60. Scroll wheel 50 extends outward from aperture 34 and has a generally circular or wheel-shaped structure. An axle 51, which defines an axis of rotation, is rotatably-mounted on a pair of supports 52a and 52b extending through a central portion of scroll wheel 50, thereby permitting scroll wheel 50 to revolve about axle 51 in either a forward or backward direction.

Figure 3:
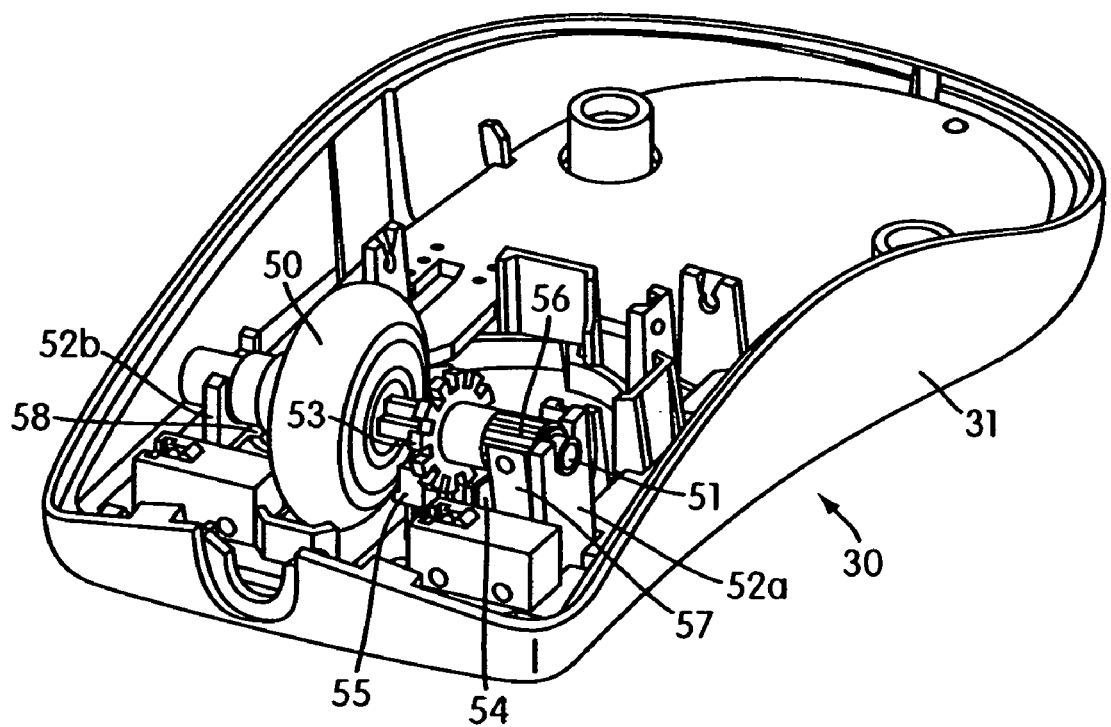
FIG. 3 is a cut-away perspective view of the first input device depicting a scroll wheel and associated components.

In order to detect the rotational movement of scroll wheel 50, a sensing device is positioned within housing 31 and in proximity to scroll wheel 50 or axle 51. As depicted in FIG. 3, the sensing device is an optical encoder having an encoder wheel 53, a light source 54, and a light detector 55. Encoder wheel 53 includes a plurality of blades that extend between light source 54 and light detector 55. Light source 54 incorporates a light emitting diode and light detector 55 includes a phototransistor. In operation, a rotational movement of scroll wheel 50 achieves a corresponding rotation in encoder wheel 53, thereby causing the blades to alternately obstruct light shining from light source 54 to light detector 55. When light repetitively intercepts light detector 55, a corresponding signal is transmitted to host computer 10, thereby indicating that the individual is rotating scroll wheel 50. Alternate sensing and mounting arrangements may be utilized within the scope of the present invention.

A detent mechanism is also incorporated into scrolling apparatus 40 to prevent scroll wheel 50 from rotating unintentionally and to provide control of scroll wheel 50 and a segmented feel to the rotation of scroll wheel 50. The detent mechanism includes a plurality of grooves 56, which are located around axle 51, and a resistance mechanism 57 that extends into grooves 56. Resistance mechanism 57 prevents relatively low rotational forces from rotating scroll wheel 50. Upon the application of greater rotational forces, however, axle 51 will rotate despite the resistance provided by resistance mechanism 57. In order to ensure that relatively small angular rotations of scroll wheel 50 are detected by the sensing device, the angular separation of the blades on encoder wheel 53 may be less than the angular distance between adjacent grooves 56.

A switch 58 is also mounted adjacent to axle 51 to sense downward pressure applied to scroll wheel 50. Axle 51 is configured to move a relatively small amount in a direction perpendicular to the axis of rotation, and switch 58 closes in response to the perpendicular movement. Accordingly, scroll wheel 50 also functions as a button. When switch 58 is activated, a corresponding signal is transmitted to host computer 10, thereby indicating that the individual is depressing scroll wheel 50 generally toward the interior of housing 31.

The above discussion regarding the configuration of scroll wheel 50 and associated components discloses a structure wherein the individual may rotate or depress scroll wheel 50 in order to transmit corresponding signals to host computer 10. The specific structure depicted in FIG. 3 is intended to provide an example of one configuration suitable for providing the rotational and depressional functions of scroll wheel 50. One skilled in the relevant art will recognize that a plurality of other structures may also be utilized to perform substantially similar functions. The manner in which scroll wheel 50 may be utilized for multi-directional scrolling of image 21 on display screen 22 will be disclosed following a discussion regarding the structure of actuator 60.

Actuator 60 is a solid, depressible ring located immediately adjacent scroll wheel 50 and extending around scroll wheel 50. A directional switch mechanism is associated with actuator 60 such that one of a plurality of different signals may be transmitted to host computer 10 when actuator 60 is depressed generally toward the interior of housing 31. The particular signal transmitted to host computer 10, however, depends upon the specific portion of actuator 60 that is depressed by the individual. For reference purposes in the following discussion, actuator 60 is divided into four portions 61a–61d that each include indicia 66a–66d preferably in the form of an arrow pointing radially away from scroll wheel 50. As discussed above, actuator 60 is located immediately adjacent to scroll wheel 50. As utilized herein, the phrase "immediately adjacent" is intended to denote a configuration wherein actuator 60 is positioned adjacent to the scroll wheel 50, with no additional components or sections of the housing of input device 30 intervening between actuator 60 and scroll wheel 50. However, the actuator 60 need not be immediately adjacent to scroll wheel 50 to function effectively. Accordingly, actuator 60 may be immediately adjacent to scroll wheel 50 without hindering the rotation of scroll wheel 50, or the actuator 60 may be spaced away from the scroll wheel 50.

Figure 4:
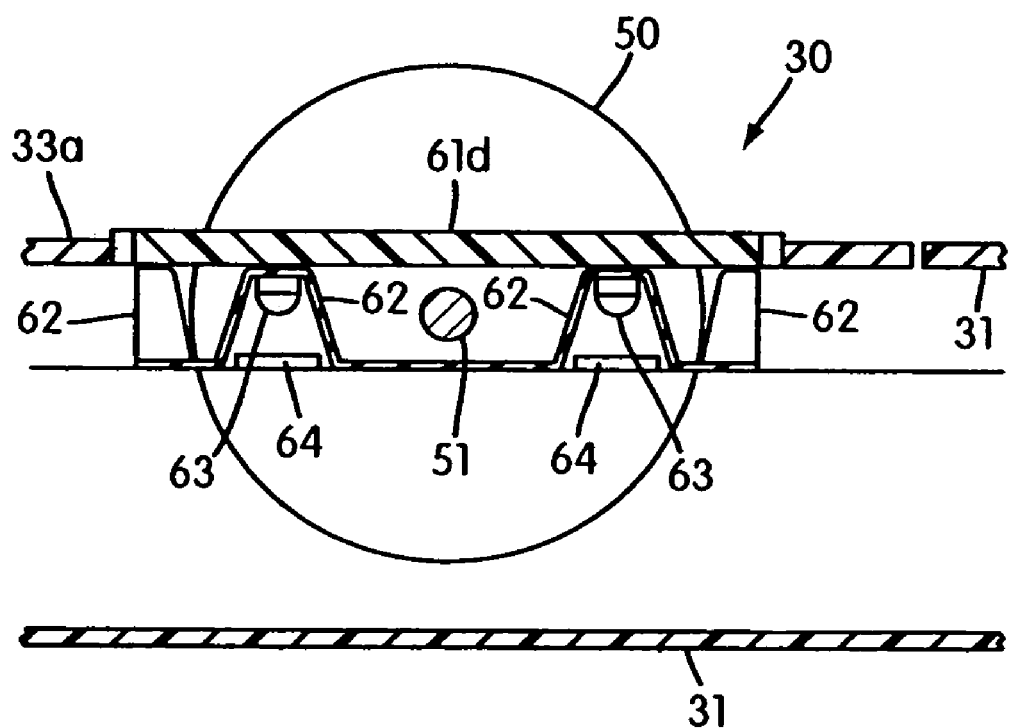
FIG. 4 is a cross-sectional view of the first input device, as defined by line 4—4 in FIG. 2, depicting an actuator and associated components.

The structure of scrolling apparatus 40, particularly in relation to actuator 60, will now be discussed. As depicted in FIG. 4, a plurality of sensors in the form of compressible projections 62, conductors 63, and contacts 64 are positioned beneath the actuator 60 to form a directional switch. Preferably, at least four switches/projections 62 are used and are disposed at increments of 90 degrees to sense when the actuator 60 is depressed downward at those locations. This enables vertical scrolling (up and down) and horizontal scrolling (right and left). Additional switches/projections 62 can be used and be disposed at a smaller angular spacing, such as 45 degree increments. Such spacing would facilitate diagonal scrolling in the XY plane in addition to vertical scrolling (up and down) and horizontal scrolling (right and left).

Projections 62 may be formed of a flexible polymer material, such as rubber, that extends between actuator 60 and the surface of a circuit board that includes contacts 64. Conductors 63 are formed of a conducting material and are located within projections 62. The projections 62 provide support for actuator 60 and, upon application of a downward force on actuator 60, projections 62 compress such that conductors 63 make contact with contacts 64, thereby permitting current to flow between contacts 64. In this manner, projections 62, conductors 63, and contacts 64 behave as a dome switch. Springs or other support devices may also be utilized to provide additional support to the actuator 60.

When the actuator 60 is not depressed (i.e., when the individual is not pressing downward upon actuator 60), projections 62 supports actuator 60 and conductors 63 remain out of contact with contacts 64. When a downward force sufficient to overcome the support provided by projections 62 depresses actuator 60 (i.e., when the individual depresses actuator 60, thereby moving actuator 60 toward the interior of housing 31), however, one or more conductors 63 contact corresponding contacts 64. Thus, the projections 62 act similar to dome-type switches providing an inherent upward biasing force and collapsing upon an applied predetermined downward force to close the switch.

Each conductor 63 may have a planar or curved configuration. With a curved configuration, as depicted, a downward force upon actuator 60 will cause one or more conductors 63 to deform against corresponding contacts 64. More particularly, a relatively small downward force will cause only the bottom portion of a particular curved conductor 63 to make contact with a corresponding contact 64, and greater downward forces will cause an increasing area of conductor 63 to contact and deform against contact 64. As the area of contact between conductor 63 and contact 64 increases, the current flow between portions of contact 64 increases in a proportional manner. Accordingly, the varying degree of conductivity inherent in this structure provides the quality of pressure-sensitivity to actuator 60, which is indicative of the degree of downward force applied to actuator 60.

Contact between select conductors 63 and contacts 64 causes current to flow through contacts 64 and to a microprocessor located within input device 30. A signal from the microprocessor is then transmitted to host computer 10 where a driver program directs scrolling. Alternately, the microprocessor may be absent such that a signal, in the form of current, is transmitted directly from contacts 64 to computer 10. The varying conductivity in contacts 64 modifies the current that flows to the microprocessor in response to a depression of actuator 60. Differences in the current that flows through different contacts 64 may be utilized to determine the precise location where the individual is depressing actuator 60. For example, a downward force upon a central area of portion 61a may result in current flowing only through contacts 64 located directly below portion 61a. A downward force upon an area between portions 61a and 61b, however, may result in contacts 64 located below both portions 61a and 61b to provide current to the microprocessor. A difference in the currents may indicate, for example, that greater downward force was applied to portion 61a than portion 61b. The signals transmitted from the microprocessor to host computer 10 may be processed by host computer 10 to determine the precise area where the individual depresses actuator 60. Accordingly, this structure provides a positionally-sensitive mechanism wherein the position at which the force is applied to actuator 60 may be determined.

Potentiometers, otherwise known as variable resistors, may also be utilized to sense the degree of depression in actuator 60 in lieu of the compressible projections. A first pin and a second pin positioned orthogonal to each other may be connected to actuator 60. The first pin may control the resistance in a first potentiometer and the second pin may control the resistance in a second potentiometer. In this potentiometer system, current constantly flows through each potentiometer, but the amount of current is determined by the degree of rotation in each pin. For example, depressing portion 61a rotates the first pin, but not the second pin, thereby altering the flow of current through the first potentiometer. Depressing portion 61d rotates the second pin, but not the first pin, thereby altering the flow of current through the second potentiometer. Similarly, depressing an area between portion 61a and portion 61d rotates both the first and second pin, thereby altering the current through both potentiometers. Changes in current may affect the current flowing to the microprocessor, thereby indicating which of portions 61a–1d are depressed and the degree of depression. In turn, computer 10 may process signals from the microprocessor to determine the precise location where the individual is depressing actuator 60. Accordingly, this structure also provides a positionally-sensitive mechanism wherein the position at which the force is applied to actuator 60 may be determined.

Springs or other resistance mechanisms may also be incorporated into the potentiometer system to resist the downward force on actuator 60 such that a relatively small downward force will effect only a small change in the current. Similarly, a greater downward force will effect a greater change in the current. The potentiometer system, therefore, has pressure-sensitive qualities that are indicative of the deflection of actuator 60.

The above discussion discloses the manner in which scrolling apparatus 40 operates. As discussed, scroll wheel 50 may be depressed or scroll wheel 50 may be rotated in either the forward direction or the backward direction, and actuator 60 may be depressed in one of a plurality of locations and with varying downward forces. Upon depressing or rotating scroll wheel 50 or depressing actuator 60, the microprocessor transmits corresponding signals to host computer 10, thereby directing the manner in which image 21 is intended to scroll relative to display screen 22. Specific information regarding the scrolling motion of image 21 and the manner in which scrolling apparatus 40 may be utilized to scroll image 21 will now be discussed in greater detail.

Image 21 may include a rendered portion and a hidden portion, and the individual may not, therefore, be capable of viewing all portions of image 21 simultaneously. Scrolling apparatus 40 permits the individual to scroll image 21 relative to display screen 22. Image 21 may be scrolled in a variety of directions, including up, down, left, right, and any diagonal direction. For reference purposes, display screen 22 includes x-axis 23, which corresponds with the left and right directions, and y-axis 24, which corresponds with the up and down directions.

The hidden portions of many images, including the images rendered from many Web pages and text documents, are often located above and below the rendered portion. That is, many images do not include a hidden portion located to the left or the right of the rendered portion. Accordingly, the majority of the scrolling that an individual encounters in common computer usage requires scrolling only along y-axis 24. By rotating scroll wheel 50 forward, for example, image 21 may be scrolled upwards, or along the positive portion of y-axis 24. Similarly, rotating scroll wheel 50 backwards may scroll image 21 in the downward direction, or along the negative portion of y-axis 24. In this manner, the most common scrolling directions are readily accessible to the individual by merely rotating scroll wheel 50 in one of two directions about its rotational axis.

Scroll wheel 50 permits the individual to select a scrolling direction of image 21 that is along the positive portion of y-axis 24 or along the negative portion of y-axis 24. In addition scroll wheel 50 permits the individual to select a scrolling velocity of image 21. By slowly rotating scroll wheel 50, image 21 may scroll at a relatively slow velocity. By rotating scroll wheel 50 at a faster velocity, however, the scroll velocity of image 21 may be increased.

Although scrolling along y-axis 24 may be most common, an individual's ability to view many images 21 would be enhanced by scrolling along x-axis 23. Such images 21 include digital photographs, spreadsheets, and computer-generated drawings, for example, where the width of the image 21 exceeds the width of the display. A first method of scrolling along x-axis 23 relates to scroll wheel 50. As discussed above, scroll wheel 50 may be depressed. By depressing and holding scroll wheel 50, for example, movement of input device 30 may transmit a corresponding signal to computer 21 regarding the scrolling of image 21. Input device 30 is a mouse and includes a pointing assembly that is normally utilized for directing the pointer. When scroll wheel 50 is depressed, however, the pointing assembly could be utilized to direct the scrolling of image 21. Accordingly, depressing scroll wheel 50 and moving input device 30 may be utilized to scroll image 21 along x-axis 23, y-axis 24, or any diagonal direction therebetween.

A second method of scrolling along x-axis 23 relates to the function of actuator 60. As discussed above, a plurality of signals may be transmitted to host computer 10 as a result of depressing actuator 60. The signals relate to the area of actuator 60 that is depressed and the force utilized to depress actuator 60. Portions 61a–1d may be utilized to scroll image 21 in the up, right, down, and left directions, respectively. That is, depressing only portion 61a may cause the microprocessor to transmit a signal to host computer 10 directing that image 21 be scrolled along the positive portion of y-axis 24. Depressing a combination of portions 61, however, may be utilized to scroll image 21 in a diagonal direction. For example, depressing the area between portion 61a and portion 61b scrolls image 21 in the up and right directions simultaneously, or along a diagonal line that extends between the positive portions of x-axis 23 and y-axis 24. Accordingly, actuator 60 is coupled to a directionally-sensitive mechanism and may be utilized for scrolling image 21 in multiple directions.

The speed of scrolling in the direction of the portion of the actuation that has been depressed may be based on the amount time that the actuator 60 is depressed. For example, software can increase the velocity of scrolling if the user keeps the actuator 60 depressed in the same direction for certain periods of time. Algorithms may be written to and assigned for various user preferences. Additionally, since the scroll wheel 50 can control micro-scrolling, depressing the upper and lower portions 61a and 61c of actuator 60 can be used to control scrolling at faster velocities for rapid velocity of macro-scrolling if desired. This combination of features for micro-scrolling and macro-scrolling, and their proximity to one another, can help fast and accurate scrolling within the document.

Alternatively and/or additionally, the velocity of scrolling may be a function of the downward force applied to the actuator 60. For example, in depressing portion 61c, for example, the individual may apply a relatively small force or a relatively large force. Both the small and large forces will affect downward (i.e., scrolling along the negative portion of y-axis 24), and the differences in forces may also be utilized to direct the velocity at which image 21 scrolls. The small force may direct that image 21 scroll slowly, whereas the large force may direct that image 21 scroll more quickly. Accordingly, the pressure-sensitive quality of conductors 63 and contacts 64 may be utilized to affect the rate at which image 21 scrolls.

In addition to affecting the rate at which image 21 scrolls, software may be used to interpret signals from the actuator 60 to rapidly move to specific portions of image 21. For example, if desired, a "double tap" of actuator 60 in a predetermined location can transmit a signal that the individual wishes to "jump" to the one of the top, bottom, or sides of the displayable image. This function may be of particular utility when image 21 possesses a relatively large area and a significant period of time would elapse by merely scrolling to the desired location of image 21. Algorithms for determining the necessary time and/or force for a "tap" may be written to and assigned for various user preferences.

Another configuration relates to the velocity at which scrolling occurs. The individual may utilize the rotation of scroll wheel 50 to scroll image 21 along y-axis 24. Scrolling with scroll wheel 50, however, may generally be slow due to the repetitive finger movements necessary to scroll relatively large distances. Accordingly, signals from the combination of the rotation of the scroll wheel 50 and the depressing of the actuator 60 in the same direction 61a or 61c of actuator 60 may be configured to produce higher than average scrolling velocities.

In accordance with the above discussion, scrolling apparatus 40 may be configured to permit the individual to scroll image 21 in a variety of ways. That is, the functions associated with scroll wheel 50 and actuator 60 may significantly vary within the scope of the present invention. In order to provide the individual with control over the configuration of scrolling apparatus 40, however, driver software accompanying input device 30 may include multiple configurations or may permit the individual to customize settings regarding the function of scroll wheel 50 and actuator 60.

Signals regarding the state of scroll wheel 50 and actuator 60 are transmitted from the microprocessor to host computer 10 through cord 32, and the signals may also be transmitted though a wireless connection wherein input device 30 incorporates a transmitter and host computer 10 incorporates a receiver. One skilled in the relevant art will appreciate that either analog signaling or digital signaling may be utilized to convey the signals through either cord 32 or a wireless connection.

Actuator 60, as disclosed above, is a solid ring that extends around scroll wheel 50. Within the scope of the present invention, however, multiple actuators may extend around a scroll wheel. An input device 130 is disclosed in FIG. 5 and includes a housing 131, a tracking assembly (not depicted) for moving a cursor on display screen 22, a cord 132 for connecting with host computer 10, and a pair of keys 133a and 133b. Accordingly, input device 130 has a general structure that is similar to the structure of input device 30. Housing 131 forms an aperture 134 and includes a scrolling assembly 140 located within aperture 134. Scrolling assembly 140 includes a scroll wheel 150 having the general structure of scroll wheel 50 and a pair of actuators 160a and 160b located on the sides of scroll wheel 150 and extending around scroll wheel 150, preferably, but not necessarily, in the general configuration of a completed ring as depicted.

Scroll wheel 150 may be utilized for scrolling along y-axis 24, as described with respect to scroll wheel 50. Actuators 160a and 160b, however, may be utilized for scrolling along x-axis 23. By depressing actuator 160a, which is located to the left of scroll wheel 150, the individual may direct image 21 to scroll along the negative portion of x-axis 23, or to the left. Similarly, depressing actuator 160b, which is located to the right of scroll wheel 150 may direct image 21 to scroll along the positive portion of x-axis 23, or to the right. Actuators 160a and 160b may also be associated with a pressure-sensitive directional switch mechanism or alternative sensing system. Accordingly, depressing various portions of actuators 160a and 160b may permit the individual to scroll in a variety of directions at speeds that are determined by the degree of downward force applied to one or both of actuators 160a and 160b. Alternately, actuators 160a and 160b may be connected to non-directional switches that merely detect when actuators 160a and 160b are depressed.

Figure 6:
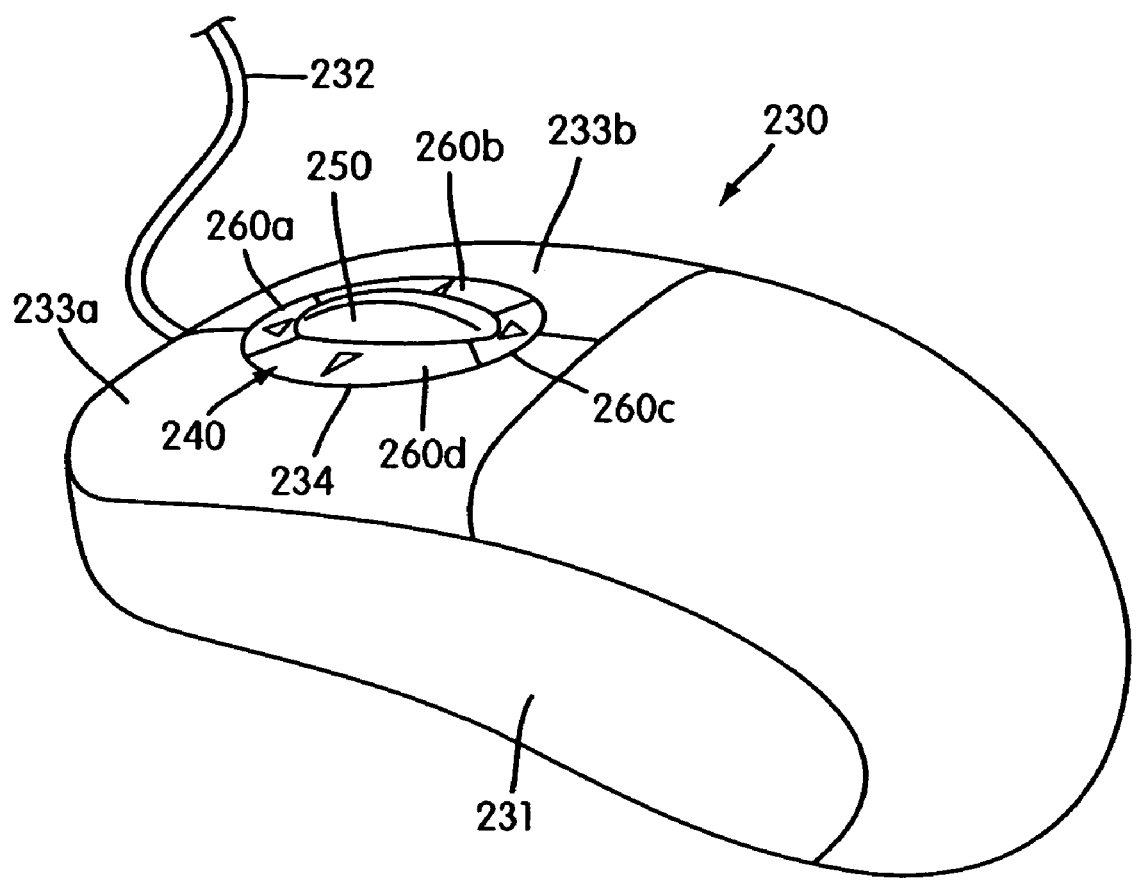
FIG. 6 is a perspective view of a third input device incorporating a third scrolling apparatus.

An input device 230 is disclosed in FIG. 6 and includes a housing 231, a tracking assembly (not depicted) for moving a cursor on display screen 22, a cord 232 for connecting with host computer 10, and a pair of keys 233a and 233b. Housing 231 forms an aperture 234 and includes a scrolling assembly 240 located within aperture 234. Scrolling assembly 240 includes a scroll wheel 250 having the general structure of scroll wheel 50. In addition, scrolling assembly 240 includes four separate actuators 260a–260d that form discrete, depressible buttons extending around scroll wheel 250. Scroll wheel 250 may be utilized for scrolling along y-axis 24 and actuators 260 may be utilized for scrolling in a variety of directions, including along x-axis 23 and y-axis 24. By depressing actuator 260a, which is located forward of scroll wheel 250, the individual may direct image 21 to scroll along the positive portion of y-axis 24. Indicia, such as an arrow, may be located on actuator 260a to indicate the scrolling direction. Similarly, depressing actuators 260b–260d may direct image 21 to scroll in corresponding directions. Actuators 260a–260d may also be associated with a pressure-sensitive directional switch, or a non-directional switch.

Figure 7:
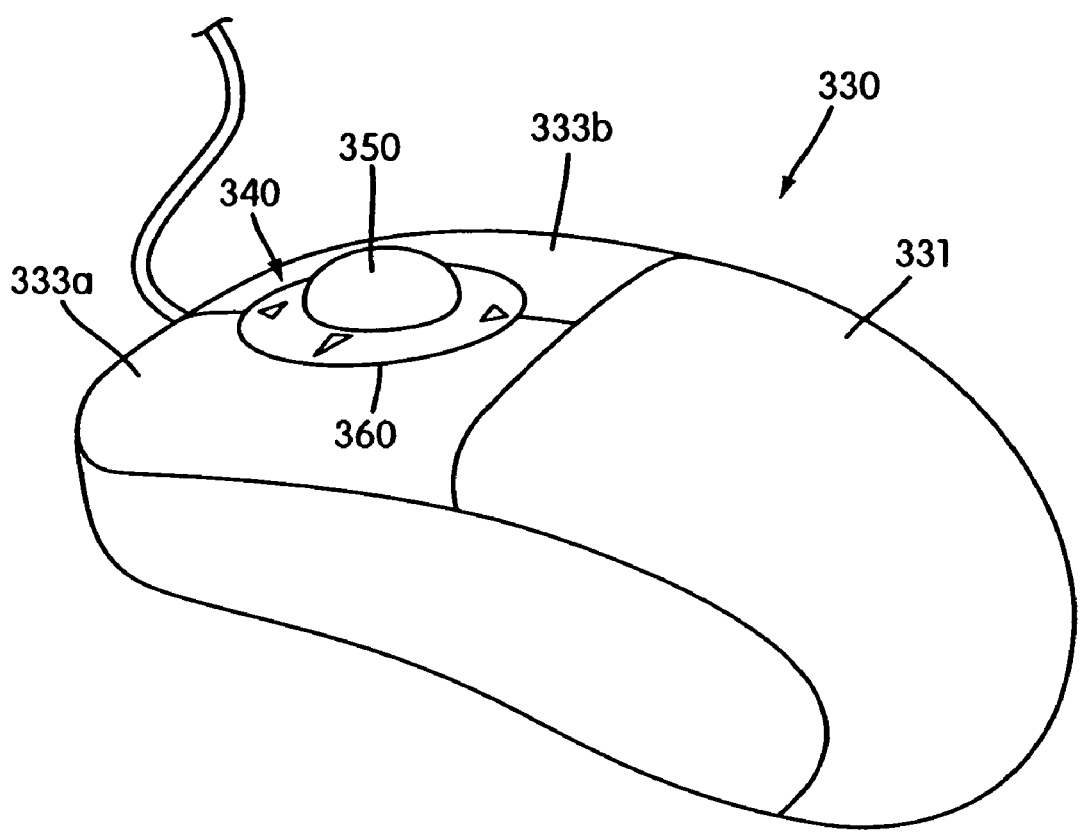
FIG. 7 is a perspective view of a fourth input device incorporating a fourth scrolling apparatus.

An input device 330, which is also a mouse-style pointing device, is disclosed in FIG. 7 and includes an outer housing 331 generally shaped to conform to the shape of the hand. Input device 330 also includes a tracking assembly (not depicted) for moving a cursor on display screen 22, a pair of keys 333a and 333b for manipulating objects, and a scrolling apparatus 340.

The primary elements of scrolling apparatus 340 are a spherical scroll ball 350 and an actuator 360. Scroll ball 350 is mounted within housing 331 so as to rotate about any axis, and a portion of scroll ball 350 extends outward from housing 331 to provide the individual with access to scroll ball 350. An encoder system located within housing 331 detects the rotational motion of scroll ball 350, and corresponding signals are transmitted to host computer 10 regarding the direction and velocity at which scroll ball 350 is rotated. More particularly, scroll ball 350 may be supported on a pair of orthogonal axles, for example. Optical encoder wheels positioned on each axle rotate with the rotation of scroll ball 350. A light source and a light sensor detect the motion of the optical encoders, thereby providing a signal to host computer 10 regarding the direction and velocity of scroll ball 350. In addition, one of the axles supporting scroll ball 350 may be configured to trigger a switch upon the application of a downward force to scroll ball 350. Upon the application of a sufficient downward force to scroll ball 350, therefore, a corresponding signal may be transmitted to host computer 10. In lieu of such a ball motion sensing system, an optical sensing system that senses the angular rotation of the ball by reflecting light off its surface may also be used.

Figure 5:
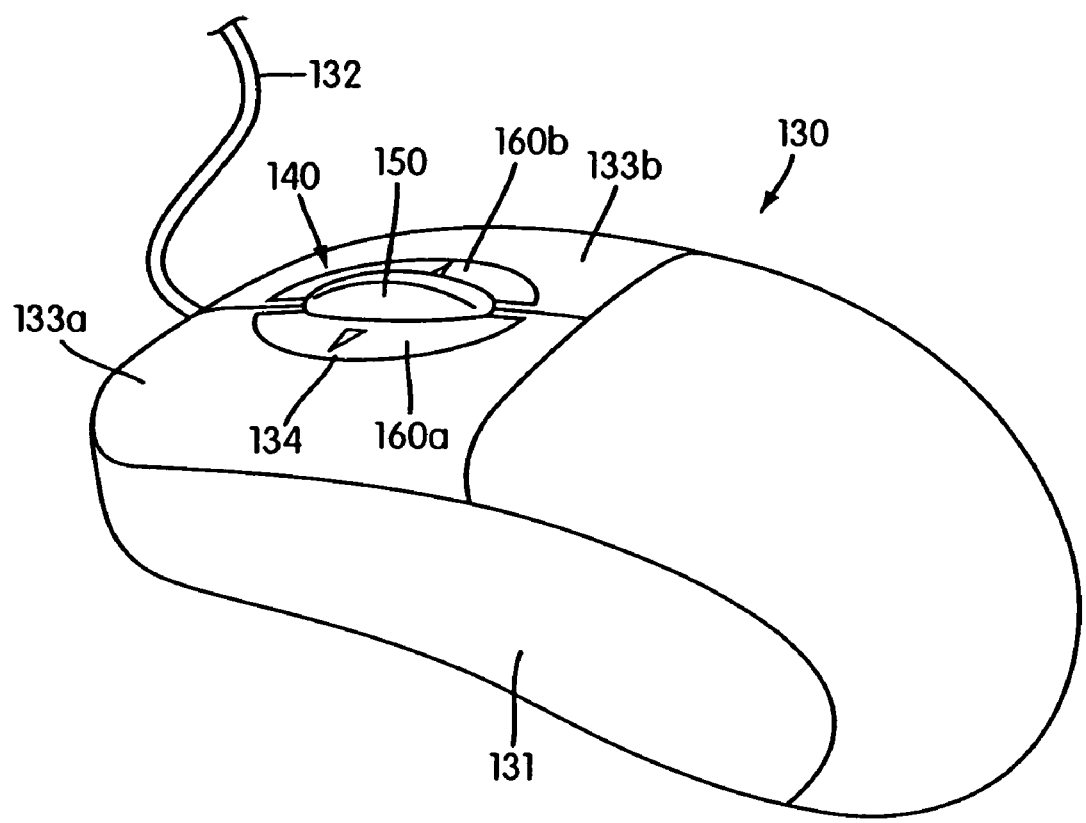
FIG. 5 is a perspective view of a second input device incorporating a second scrolling apparatus.

Actuator 360 extends around scroll ball 350 and has the general configuration of a directional switch capable of transmitting a plurality of different signals to host computer 10 when actuator 360 is depressed. The structure of actuator 360 may be similar to the structure discussed in relation to actuator 60 or as shown in the actuators of FIG. 5 or 6. Accordingly, the structure associated with actuator 360 may include a directional switch mechanism and the signals transmitted to host computer 10 may relate to the specific area of actuator 360 that is depressed and the degree of downward force incident upon actuator 360. Alternately, a plurality of actuators may extend around scroll ball 350.

Input device 330 is utilized as a conventional mouse to move the cursor and manipulate objects on display screen 22. In addition, scrolling apparatus 340 is utilized to scroll image 321. For example, scroll ball 350 may provide relatively slow scrolling in all directions. That is, signals transmitted to host computer 10 as a result of rotating scroll ball 350 may direct that image 21 scroll along x-axis 23, y-axis 24, or in a variety of diagonal directions. In addition, scroll ball 350 may be depressed to effect immediate scrolling to the top portion of image 21, for example, and actuator 360 may be utilized for relatively fast scrolling in all directions.

The concepts underlying the present invention may also be applied to other types of pointing devices, including trackball and touchpad pointing devices. A conventional trackball pointing device generally includes a rotating trackball having a structure that is similar to scroll ball 350. By manipulating the rotation of the trackball, the individual may move a pointer on a display screen. The conventional trackball pointing device may be modified to include an actuator having the structure of actuators 60, 160a–160b, or actuators 260a–260d, for example. The actuator or actuators may surround the trackball and provide scrolling in multiple directions. A similar feature may also be incorporated into a conventional touchpad pointing device. Although the trackball is generally utilized for moving the cursor, when a specific button or other switch is activated, the function of the trackball may be converted to scrolling. Accordingly, the present invention may be applied to a variety of pointing devices within the scope of the present invention.

As disclosed in the preceding discussion, the present invention involves multi-directional scrolling apparatuses for moving or scrolling an image along a variety of axes relative to a display screen. Each scrolling apparatus provides the individual with a selection of ways in which scrolling may be affected. For example, the individual may select scrolling methods associated with a scroll wheel, a scroll ball, or one of a plurality of depressible actuators. By providing the individual with a selection of scrolling methods, the proper scrolling method for each task may be selected, thereby improving the efficiency of the individual and the convenience of utilizing a computing device.

The present invention is disclosed above and in the accompanying drawings with reference to a variety of embodiments. The purpose served by disclosure of the embodiments, however, is to provide an example of the various aspects embodied in the invention, not to limit the scope of the invention. One skilled in the art will recognize that numerous variations and modifications may be made to the embodiments without departing from the scope of the present invention, as defined by the appended claims.

That which is claimed is:

1. An apparatus for scrolling an image in multiple directions relative to a display screen, said apparatus comprising:
   a housing having at least one aperture therein;
   a tracking assembly at least partially located within the housing for detecting movement of the housing relative to a support surface;
   a rotatable member at least partially located within the housing, a portion of the rotatable member protruding outward through the aperture;
   at least one depressible actuator extending around the rotatable member and positioned immediately adjacent to the rotatable member; and
   a directional switch located within the housing for detecting depressions of the actuator.

2. The apparatus of claim 1, wherein the rotatable member is a scroll wheel that rotates about a predetermined axis.

3. The apparatus of claim 1, wherein the rotatable member is a sphere that rotates about a plurality of axes.

4. The apparatus of claim 1, wherein the actuator is a solid ring extending entirely around the rotatable member.

5. The apparatus of claim 1, wherein the actuator is a plurality of discrete, independently-depressible actuator portions.

6. The apparatus of claim 5, wherein the actuator portions include two actuator portions located on opposite sides of the rotating member.

7. The apparatus of claim 6, wherein the actuator portions have a semi-circular shape.

8. The apparatus of claim 5, wherein the actuator portions include four actuator portions distributed around the rotatable member at four locations separated by ninety degrees.

9. An apparatus for scrolling an image in multiple directions relative to a display screen, said apparatus comprising:
a housing having at least one aperture therein;
a tracking assembly at least partially located within the housing for detecting movement of the housing relative to a support surface;
a rotatable member at least partially located within the housing, a portion of the rotatable member protruding outward through the aperture; and
a depressible and ring-shaped actuator extending around the rotatable member and positioned adjacent to the rotatable member.

10. The apparatus of claim 9, wherein the rotatable member is a scroll wheel that rotates about a predetermined axis.

11. The apparatus of claim 9, wherein the rotatable member is a sphere that rotates about a plurality of axes.

12. The apparatus of claim 9, wherein a directional switch is located within the housing for detecting depressions of the actuator.

13. An apparatus for scrolling an image in multiple directions relative to a display screen, said apparatus comprising:
a housing having at least one aperture therein;
a tracking assembly at least partially located within the housing for detecting movement of the housing relative to a support surface;
a rotatable member at least partially located within the housing a portion of the rotatable member protruding outward through the aperture; and
a pair of depressible actuators extending around opposite sides of the rotatable member and positioned adjacent to the rotatable member.

14. The apparatus of claim 13, wherein the actuators have a semi-circular shape.

15. The apparatus of claim 13, wherein a directional switch is located within the housing for detecting depressions of the actuators.

16. The apparatus of claim 13, wherein the rotatable member is a scroll wheel that rotates about a predetermined axis.

17. The apparatus of claim 13, wherein the rotatable member is a sphere that rotates about a plurality of axes.

18. An apparatus for scrolling an image in multiple directions relative to a display screen, said apparatus comprising:
a housing having at least one aperture therein;
a tracking assembly at least partially located within the housing for detecting movement of the housing relative to a support surface;
a rotatable member at least partially located within the housing, a portion of the rotatable member protruding outward trough the aperture;
at least one depressible actuator extending around the rotatable member; and
indicia located on to actuator and pointing radially outward relative to the rotatable member.

19. The apparatus of claim 18, wherein the indicia are arrows.

20. The apparatus of claim 18, wherein the indicia are located forward of the rotatable member, behind the rotatable member, and on two sides of the rotatable member.

21. The apparatus of claim 18, wherein the actuator is a ring that extends entirely around the rotatable member, the indicia being located on an exterior of the ring in four locations.

22. The apparatus of claim 18, wherein the actuator includes four actuator portions distributed around the rotatable member, each actuator portion including the indicia.

23. An input device for moving a cursor relative to a display screen, the input device comprising:
a housing having at least one aperture therein;
a tracking assembly at least partially located within the housing for detecting movement of the housing relative to a support surface;
a rotatable member at least partially located within the housing, a portion of the rotatable member protruding outward through the aperture;
at least one depressible actuator extending around the rotatable member and positioned adjacent to the rotatable member; and
a primary key and a secondary key located on opposite sides of the actuator.

24. The input device of claim 23, wherein the rotatable member is a scroll wheel that rotates about a predetermined axis.

25. The input device of claim 23, wherein the rotatable member is a sphere that rotates about a plurality of axes.

26. The input device of claim 23, wherein a directional switch is located within the housing for detecting depressions of the actuator.

27. A method of scrolling an image in relation to a display screen, the method comprising steps of:
providing an input device having a rotatable member and an actuator;
configuring the input device to transmit a first signal to a host computer when the rotatable member is rotated and to transmit a second signal to the host computer when the actuator is depressed;
incorporating first data into the first signal that directs the host computer to scroll the image independent of movement of a cursor or a pointer rendered on the display screen; and
incorporating second data into the second signal that directs the host the image independent of the movement of the cursor or the pointer.

28. The method of claim 27, wherein the step of providing includes mounting the rotatable member at least partially within an aperture formed in a housing of the input device.

29. The method of claim 27, wherein the step of providing includes positioning the actuator around the rotatable member.

30. The method of claim 27, wherein the step of providing includes forming the actuator to be a ring.

31. The method of claim 27, wherein the step of providing includes forming the actuator to be a plurality of discrete actuator portions distributed around the rotatable member.

32. The method of claim 27, wherein the step of incorporating includes directing the host computer to scroll the image in a specific direction.

33. An apparatus for scrolling an image in multiple directions relative to a display screen, said apparatus comprising:
- a housing having at least one aperture therein;
- a rotatable member at least partially located within the housing, a portion of the rotatable member protruding outward through the aperture; and
- a depressible and ring-shaped actuator extending around the rotatable member and positioned adjacent to the rotatable member, wherein the rotatable member and the actuator scroll the image independent of movement of a cursor or a pointer rendered on the display screen.

34. The apparatus of claim 33, wherein the rotatable member is a scroll wheel that rotates about a predetermined axis.

35. The apparatus of claim 33, wherein the rotatable member is a sphere that rotates about a plurality of axes.

36. The apparatus of claim 33, wherein a directional switch is located within the housing for detecting depressions of the actuator.

* * * * *